J. G. LOWE.
AUTOMOBILE TIRE.
APPLICATION FILED APR. 4, 1919.
1,325,364. Patented Dec. 16, 1919.
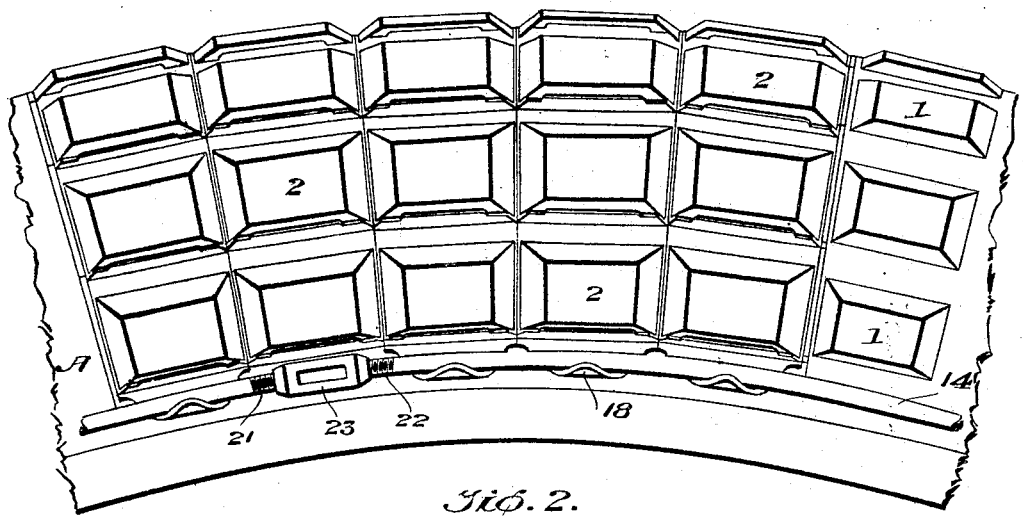
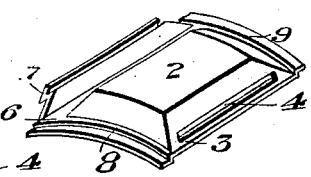
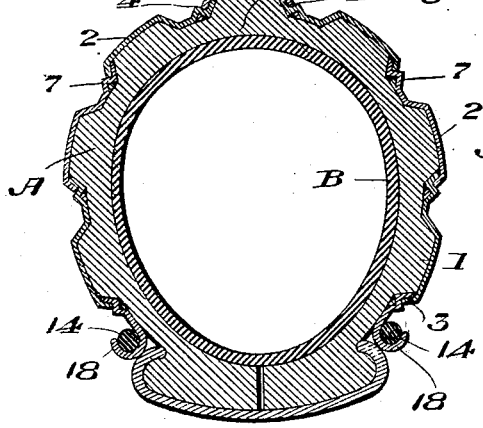
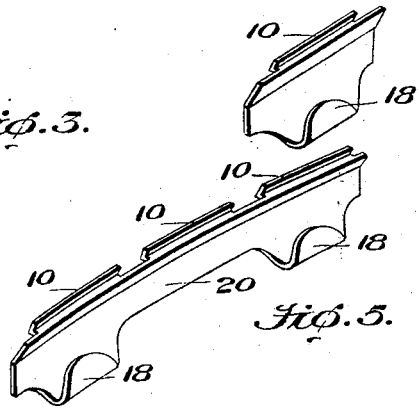
Witness
Inventor
James G. Lowe
By
his Attorney

UNITED STATES PATENT OFFICE.

JAMES G. LOWE, OF SHELBY, ALABAMA.

AUTOMOBILE-TIRE.

1,325,364.  Specification of Letters Patent.  Patented Dec. 16, 1919.

Application filed April 4, 1919. Serial No. 287,393.

*To all whom it may concern:*

Be it known that I, JAMES G. LOWE, a citizen of the United States, residing at Shelby, in the county of Shelby and State of Alabama, have invented new and useful Improvements in Automobile-Tires, of which the following is a specification.

My invention relates to an improvement in tires for automobiles and the like.

The objects are to provide a puncture proof tire, to strengthen and support the side walls of the tire thereby preventing blow-outs, and to prolong the life and usefulness of the fabric casing and at the same time retain its pneumatic features.

With the foregoing and other objects in view, my present invention consists in a flexible metal cover made in sections which substantially conform to the external formation of the tire casing, said sections being hinged or pivoted together transversely and overlapping longitudinally of the tire and held under tension at its inner edges, which tension is adjustable from each side to draw the cover from the longitudinal center toward each edge of the tire.

In the accompanying drawing, Figure 1, is a fragmentary side elevation; Fig. 2, is a view in perspective of one of the metal cover sections, Fig. 3 is a transverse section through the tire and cover; and Figs. 4 and 5 are views in perspective of two different forms of fastenings.

A represents a fabric casing and B is the usual inner tube. Formed on the surface of the fabric casing are a series of bosses 1, which might be in different forms but which preferably are in the general shape of truncated pyramids. These are shown arranged in rows extending circumferentially and transversely of the tire being cast integral therewith but obviously this is all subject to more or less variation to suit the requirements.

Caps are fitted to each of the pyramidal enlargements 1, as shown in Figs. 1, 2 and 3. These are designated by the numeral 2 and are made of sheet metal stamped into shape to conform to the bosses 1, which they fit and over which they are held as shown in Figs. 1 and 2.

These caps are preferably made in two forms differing only slightly and as shown in Fig. 2, those occupying the central circumferential part of the tire having their side flanges alike, and both of which flanges 3, are provided with a slot 4, which extends longitudinally thereof, as shown in Fig. 2, of the drawings, whereas all the other caps 2, have only one slotted side, with the other or opposite side or edge bent into the form of a channel 6, and terminating in a Z-shape flange 7, adapted to enter and interlock with the slot 4, of the adjacent flange of the next cap as shown in Figs. 1 and 3, thus making a hinge joint which will give with the pneumatic fabric tire.

Flanges 8 and 9 at the opposite ends under and overlap corresponding flanges of the next adjacent cap.

Thus a flexible steel or other metal casing surrounds and incases the fabric tire with the several caps, they being permanently but pivotally hooked or interlocked transversely around the tire while merely overlapped longitudinally of the tire.

As a convenient means for fastening the metal casing to the tire, I have shown two different forms of clips as illustrated in Figs. 4 and 5. These are practically the same except that one is single and the other is double and in the form shown in Fig. 4 the plate forming the clip has a Z-shape tongue 10, at one edge which is adapted to enter and interlock with the slot 4, of the adjacent flange of the nearest cap 2, to be fastened. The double clip shown in Fig. 5, is in effect two of the clips combined in one with a central portion 20, with the same interlocking tongues 10, to enter the slot of the next adjacent cap 2. In both forms of clips there is a hook 18, which takes under the fastening rod 14, and there is one of these rods on each side of the tire as shown in Fig. 2, the ends of the rods terminating in right and left threads 21, and 22, respectively and the turn buckle 23, thereon is employed to draw the ends of the rods together with the required tension thereby simultaneously pulling on every cap, to cause them to snugly embrace the tire and remain in place as a metal facing upon the several enlargements 1, of the fabric tire.

The purpose of the double clip will be readily understood as it is a provision to span and provide a fastening for the caps next to the turn-buckles which otherwise would have no means of fastening.

A tire protector of this character will greatly prolong the life of an ordinary tire, by resisting punctures and blow-outs by its added strength to the walls of the fabric tires and by ensheathing the entire tire. Furthermore it is easily applied or removed and it does not add greatly to the weight or cost and when the added life of the tire is considered, these considerations are altogether insignificant.

I claim:

1. The combination with a fabric casing having bosses, of a plurality of interlocked caps which form a flexible metal sheathing therearound, fastening rods connected with the inner rows of caps and means for applying tension thereto.

2. The combination with a fabric casing having bosses thereon, of caps for each boss interlocked on their side edges and overlapped at their ends, fastening rods connected with the inner rows of caps and means for applying tension thereto.

3. The combination with a fabric casing having bosses thereon, of caps substantially fitting each boss and interlocking and overlapping on their adjacent edges, fastening rods, means for applying tension thereto, and clips for connecting said rods and the adjacent row of caps together whereby the caps are securely fastened around the fabric tire.

In testimony whereof I have signed my name to this specification in the presence of two subscribing witnesses.

JAMES G. LOWE.

Witnesses:
   J. G. HEADDICK,
   D. E. GRAY.